(12) United States Patent
Mori et al.

(10) Patent No.: US 8,282,853 B2
(45) Date of Patent: Oct. 9, 2012

(54) NIMNZN BASED FERRITE

(75) Inventors: Kentaro Mori, Chuo-ku (JP); Takuya Aoki, Chuo-ku (JP)

(73) Assignee: TDK Corporation, Chuo-Ku, Tokyo (JP)

( * ) Notice: Subject to any disclaimer, the term of this patent is extended or adjusted under 35 U.S.C. 154(b) by 562 days.

(21) Appl. No.: 12/564,483

(22) Filed: Sep. 22, 2009

(65) Prior Publication Data

US 2010/0078587 A1  Apr. 1, 2010

(30) Foreign Application Priority Data

Sep. 30, 2008 (JP) .............................. P2008-252458

(51) Int. Cl.
*H01F 1/34* (2006.01)
(52) U.S. Cl. ................ 252/62.62; 252/62.59; 252/62.63
(58) Field of Classification Search ............... 252/62.62, 252/62.63, 62.59
See application file for complete search history.

(56) References Cited

U.S. PATENT DOCUMENTS

| | | | | |
|---|---|---|---|---|
| 6,495,059 | B1 * | 12/2002 | Aoki et al. | 252/62.6 |
| 6,652,768 | B2 * | 11/2003 | Aoki et al. | 252/62.56 |
| 6,752,932 | B2 * | 6/2004 | Ishida et al. | 252/62.62 |
| 6,790,379 | B2 * | 9/2004 | Aoki et al. | 252/62.64 |

FOREIGN PATENT DOCUMENTS

| | | |
|---|---|---|
| CN | 1293169 | 5/2001 |
| CN | 1404076 | 3/2003 |
| JP | 07-211533 | 8/1995 |
| JP | 10-326706 | 12/1998 |
| JP | 3597666 | 9/2004 |
| JP | 3597673 | 9/2004 |
| JP | 3917216 | 2/2007 |
| JP | 2007-051052 | 3/2007 |
| JP | 2007-197254 | * 8/2007 |

* cited by examiner

*Primary Examiner* — Carol M Koslow
(74) *Attorney, Agent, or Firm* — Drinker Biddle & Reath LLP

(57) ABSTRACT

A novel NiMnZn-based ferrite which can reduce magnetic loss (core loss) at a high frequency of about 2 MHz or higher and achieve higher saturated magnetic flux density while forming high sintered density is provided. The NiMnZn-based ferrite contains a main component comprising 54.0 to 57.5 mol % of iron oxide in terms of $Fe_2O_3$, 2.0 to 7.0 mol % of zinc oxide in terms of ZnO, 0.5 to 4.7 mol % of nickel oxide in terms of NiO, and a remainder of manganese oxide (in terms of MnO); and an accessory component comprising 100 to 1000 ppm by weight of Si in terms of $SiO_2$, 800 to 3000 ppm by weight of Ca in terms of $CaCO_3$, and 520 to 1000 ppm by weight of Nb in terms of $Nb_2O_5$ with respect to the main component; while having an average ferrite crystal particle size of 2.1 to 8.5 μm.

8 Claims, No Drawings

NIMNZN BASED FERRITE

BACKGROUND OF THE INVENTION

1. Field of the Invention

The present invention relates to a NiMnZn-based ferrite which can reduce magnetic loss (core loss) at a high frequency of about 2 MHz or higher, for example, and achieve higher saturated magnetic flux density while forming high sintered density.

2. Related Background Art

Recently, as electronic devices have been reducing their size and weight, switching power supplies have been made smaller. For inductance elements such as transformers and choke coils in switching power supplies, MnZn and MnZnNi ferrites have widely been in use because of their high saturated magnetic flux density.

Such recent switching power supply circuits tend to be switched at high frequencies in order to lower their operating voltage, whereby ferrite cores used therein have been desired to minimize their magnetic loss (core loss) at high frequencies.

The magnetic loss (core loss) of a ferrite core is constituted by hysteresis loss, eddy current loss, and residual loss. The hysteresis loss changes in proportion to the frequency because of DC hysteresis, while the eddy current loss increases in proportion to the square of frequency because of an electromotive force generated by an eddy current caused by an electromagnetic induction action. The residual loss, which is the remainder of loss, is supposed to be caused by so-called domain-wall resonance, natural resonance, and diffusion resonance.

As the prior art that seems to relate to the present application, there are the following literatures. Japanese Patent Application Laid-Open No. 2007-51052 proposes an MnZnNi-based ferrite which can achieve low power loss even at a frequency of 2 MHz or higher. While the above-mentioned ferrite necessitates Ta as an accessory component, the present invention does not necessarily contain Ta.

While Japanese Patent Application Laid-Open No. 2007-51052 suggests an addition of Nb, its range of addition differs from that in the present invention, and they differ from each other in terms of the desirable average crystal particle size to be formed.

Japanese Patent No. 3597666 (Japanese Patent Application Laid-Open No. 10-270231) proposes an MnNi ferrite-based material which is used for a magnetic core of a power transformer and yields low loss at a high frequency of about 1 MHz or higher.

While it suggests an addition of Nb, its range of addition differs from that in the present invention. It does not disclose any desirable average crystal particle size. Its experiments were conducted only at a frequency of 1 MHz; no experiments were carried out for seeing effects at 2 MHz.

Japanese Patent Application Laid-Open No. 10-326706 proposes a ferrite material having high sintered density and high strength while exhibiting low loss in a high-frequency region of about 1 MHz or higher.

The addition of Nb is neither disclosed nor suggested. There is no disclosure concerning the desirable average crystal particle size to be formed. Its experiments were conducted only at a frequency of 1 MHz; no experiments were carried out for seeing effects at 2 MHz.

Japanese Patent No. 3917216 (Japanese Patent Application Laid-Open No. 10-64715) proposes a ferrite magnetic core material having high saturated magnetic flux density with low loss, which is employed in power transformers and the like in switching power supplies and the like.

While it suggests an addition of Nb, its range of addition differs from that in the present invention. There is no disclosure concerning the desirable average crystal particle size to be formed. Its experiments were conducted only at a frequency of 100 kHz; no experiments were carried out for seeing effects at 2 MHz.

Japanese Patent No. 3597673 (Japanese Patent Application Laid-Open No. 11-3813) proposes a ferrite material yielding low loss in a high-frequency region of about 1 MHz or higher.

While it suggests an addition of Nb, its range of addition differs from that in the present invention. There is no disclosure concerning the desirable average crystal particle size to be formed. Its experiments were conducted only at a frequency of 1 MHz; no experiments were carried out for seeing effects at 2 MHz.

Japanese Patent Application Laid-Open No. 7-211533 proposes a method of manufacturing an oxide magnetic material yielding low loss at high frequencies and low residual magnetic flux density, which is used in switching power supplies and the like.

It does not relates to MnZnNi ferrites but MnZn ferrites (see comparative examples where Ni=0 in the present application).

Its experiments were conducted only at frequencies of 500 kHz and 1 MHz; no experiments were carried out for seeing effects at 2 MHz.

Under these circumstances, it has been desired to propose a ferrite applicable to higher frequencies, a novel NiMnZn-based ferrite which can reduce the magnetic loss (core loss) at a high frequency of 2 MHz or higher and achieve higher saturated magnetic flux density while forming high sintered density in particular.

SUMMARY OF THE INVENTION

The present invention is conceived under such circumstances. It is an object of the present invention to provide a novel NiMnZn-based ferrite which can reduce the magnetic loss (core loss) at a high frequency of 2 MHz or higher and achieve higher saturated magnetic flux density while forming high sintered density.

For attaining such an object, the NiMnZn-based ferrite of the present invention contains a main component comprising 54.0 to 57.5 mol % of iron oxide in terms of $Fe_2O_3$, 2.0 to 7.0 mol % of zinc oxide in terms of ZnO, 0.5 to 4.7 mol % of nickel oxide in terms of NiO, and a remainder of manganese oxide (in terms of MnO); and an accessory component comprising 100 to 1000 ppm by weight of Si in terms of $SiO_2$, 800 to 3000 ppm by weight of Ca in terms of $CaCO_3$, and 520 to 1000 ppm by weight of Nb in terms of $Nb_2O_5$ with respect to the main component; while having an average ferrite crystal particle size of 2.1 to 8.5 µm.

A preferred mode of the NiMnZn-based ferrite of the present invention contains an accessory component comprising 160 to 940 ppm by weight of Si in terms of $SiO_2$, 900 to 2900 ppm by weight of Ca in terms of $CaCO_3$, and 560 to 960 ppm by weight of Nb in terms of $Nb_2O_5$ with respect to the main component.

A preferred mode of the NiMnZn-based ferrite of the present invention has a sintered density of 4.90 g/cm³ or higher.

In a preferred mode of the NiMnZn-based ferrite of the present invention, a magnetic loss Pcv1 determined at 2 MHz, 50 mT, and 25° C. is 3000 kW/m³ or less, while a saturated magnetic flux density Bs at 25° C. is 520 mT or higher.

In a preferred mode of the NiMnZn-based ferrite of the present invention, a magnetic loss Pcv2 determined at 2 MHz, 50 mT, and 100° C. is 2700 kW/m³ or less, while a saturated magnetic flux density Bs at 100° C. is 450 mT or higher.

In a preferred mode of the NiMnZn-based ferrite of the present invention, an initial magnetic permeability $\mu i$ at 1 MHz and 25° C. is 800 or higher.

The electronic component of the present invention is constructed by using the NiMnZn-based ferrite as a core (magnetic core) and winding the core with a lead.

The switching power supply of the present invention uses the electronic component as a transformer and/or a choke coil and is constructed such as to be operable at a switching frequency of 2 MHz or higher.

The NiMnZn-based ferrite of the present invention contains a main component comprising 54.0 to 57.5 mol % of iron oxide in terms of $Fe_2O_3$, 2.0 to 7.0 mol % of zinc oxide in terms of ZnO, 0.5 to 4.7 mol % of nickel oxide in terms of NiO, and a remainder of manganese oxide (in terms of MnO); and an accessory component comprising 100 to 1000 ppm by weight of Si in terms of $SiO_2$, 800 to 3000 ppm by weight of Ca in terms of $CaCO_3$, and 520 to 1000 ppm by weight of Nb in terms of $Nb_2O_5$ with respect to the main component; while having an average ferrite crystal particle size of 2.1 to 8.5 µm; and thus can reduce the magnetic loss (core loss) at a high frequency of 2 MHz or higher and can achieve higher saturated magnetic flux density while forming high sintered density.

DESCRIPTION OF THE PREFERRED EMBODIMENTS

In the following, the NiMnZn-based ferrite of the present invention will be explained in detail.

Explanation of NiMnZn-based Ferrite

Explanation of the Main Component Composition

The NiMnZn-based ferrite of the present invention contains a main component comprising 54.0 to 57.5 mol % (preferably 54.2 to 57.3 mol %, more preferably 54.4 to 57.1 mol %) of iron oxide in terms of $Fe_2O_3$, 2.0 to 7.0 mol % (preferably 2.2 to 6.8 mol %, more preferably 2.4 to 6.6 mol %) of zinc oxide in terms of ZnO, 0.5 to 4.7 mol % (preferably 0.7 to 4.5 mol %, more preferably 0.9 to 4.3 mol %) of nickel oxide in terms of NiO, and a remainder of manganese oxide (in terms of MnO).

When the amount of $Fe_2O_3$ exceeds 57.5 mol % in the main component composition, the initial magnetic permeability $\mu i$ tends to decrease, which is disadvantageous. When the amount of $Fe_2O_3$ is less than 54.5 mol %, on the other hand, there is a disadvantageous tendency of failing to attain a high saturated magnetic flux density Bs (Bs≧450 mT in particular).

When the amount of ZnO is less than 2.0 mol % in the main component composition, there tends to occur a disadvantage that the magnetic loss becomes greater while the saturated magnetic flux density decreases. When the amount of ZnO exceeds 7.0 mol %, on the other hand, the magnetic loss tends to increase, which is disadvantageous.

When the amount of NiO is less than 0.5 mol % in the main component composition, there tends to occur a disadvantage that crystal particle sizes grow abnormally, thereby increasing the magnetic loss. When the amount of NiO exceeds 4.7 mol %, on the other hand, the initial magnetic permeability $\mu i$ tends to decrease, which is disadvantageous.

Explanation of the Accessory Component

The NiMnZn-based ferrite of the present invention contains the accessory component comprising Si, Ca, and Nb as essential ingredients. Powders of oxides or compounds to become oxides upon heating are used as materials for the accessory component. Specifically, $SiO_2$, $CaCO_3$, and $Nb_2O_5$ can be used as forms to be added.

Preferably, the accessory component comprises 100 to 1000 ppm by weight (preferably 130 to 970 ppm by weight, more preferably 160 to 940 ppm by weight) of Si in terms of $SiO_2$, 800 to 3000 ppm by weight (preferably 850 to 2950 ppm by weight, more preferably 900 to 2900 ppm by weight) of Ca in terms of $CaCO_3$, and 520 to 1000 ppm by weight (540 to 980 ppm by weight, more preferably 560 to 960 ppm by weight) of Nb in terms of $Nb_2O_5$ with respect to the main component.

When the amount of $SiO_2$ is less than 100 ppm by weight, the magnetic loss tends to become greater, which is disadvantageous. When the amount of $SiO_2$ exceeds 1000 ppm by weight, on the other hand, there tends to occur a disadvantage that the sintered density decreases, thereby lowering the saturated magnetic flux density.

When the amount of $CaCO_3$ is less than 800 ppm by weight, the magnetic loss tends to become greater, which is disadvantageous. When the amount of $CaCO_3$ exceeds 3000 ppm by weight, on the other hand, there tends to be a disadvantage that abnormal particle growth occurs, thereby increasing the magnetic loss.

When the amount of $Nb_2O_5$ is less than 520 ppm by weight, there tends to occur a disadvantage that the sintered density decreases, thereby lowering the saturated magnetic flux density. When the amount of $Nb_2O_5$ exceeds 1000 ppm by weight, on the other hand, there tends to be a disadvantage that abnormal particle growth occurs, thereby increasing the magnetic loss.

Other ingredients such as $ZrO_2$ may be added to the above-mentioned accessory component within such a range that operations and effects of the present invention are not affected thereby.

Explanation of the Crystal Particle Size and Sintered Density of the Ferrite Sintered Body of the Present Invention The NiMnZn-based ferrite of the present invention has an average crystal particle size of 2.1 to 8.5 µm (preferably 2.6 to 8.5 µm, more preferably 3.1 to 7.5 µm) and a sintered density of 4.90 g/cm³ or higher (preferably 4.92 to 4.98 g/cm³).

When the average crystal particle size is less than 2.1 µm, the initial magnetic permeability $\mu i$ tends to decrease, which is disadvantageous. When the average crystal particle size exceeds 8.5 µm, on the other hand, there tends to occur a disadvantage that the eddy current loss becomes greater, thereby increasing the magnetic loss.

Examples of parameters for controlling the crystal particle size include the composition of the ferrite, firing temperature thereof, and regulation of oxygen partial pressure at the time of firing.

Among these parameters, the ferrite composition and firing temperature are important in particular for controlling the average crystal particle size so as to make it fall within the range of 2.1 to 8.5 µm specified in the present invention. Hence, it is important to attain the ferrite composition falling within the range of the present invention and the firing temperature of 1090 to 1140° C.

When the ferrite composition is outside of the range of the present invention or the firing temperature is outside of the range mentioned above in particular, the average crystal particle size is very hard to be controlled so as to fall within the range of 2.1 to 8.5 µm specified in the present invention. For this point, see specific experimental examples which will be explained later.

The sintered density of the ferrite sintered body is preferably 4.90 g/cm³ or higher. The upper limit is typically about 5.00 g/cm³, though not restricted in particular. When the sintered density is less than 4.90 g/cm³, there tends to occur a disadvantage that the saturated magnetic flux density decreases, thereby increasing the magnetic loss.

Explanation of Physical Properties of the Ferrite Sintered Body of the Present Invention The ferrite of the present invention is provided with the following physical properties. The magnetic loss Pcv1 determined at 2 MHz, 50 mT, and 25° C. is 3000 kW/m³ or less, while the saturated magnetic flux density Bs at 25° C. is 520 mT or higher.

The magnetic loss Pcv2 determined at 2 MHz, 50 mT, and 100° C. is 2700 kW/m³ or less, while the saturated magnetic flux density Bs at 100° C. is 450 mT or higher.

The initial magnetic permeability μi at 1 MHz and 25° C. is 800 or higher.

Method of Manufacturing NiMnZn-based Ferrite

As for the NiMnZn-based ferrite of the present invention, an example of methods of manufacturing the same will now be explained in detail.

As materials for the main component, powders of oxides or compounds to become oxides upon heating are used. Specifically, powders of $Fe_2O_3$, NiO, ZnO, $Mn_3O_4$, and the like are used.

Forms of Material Powders of $Fe_2O_3$, ZnO, $Mn_3O_4$, etc.

As forms of material powders other than NiO, e.g., $Fe_2O_3$, ZnO, and $Mn_3O_4$, very common ones which are typically in use are employed.

Such material powders of the main component are weighed such that metal ions have such ratios as to form predetermined ingredients in order to yield the aimed ferrite, mixed in a wet fashion, and then temporarily fired.

The calcination is carried out at a temperature within the range of 700 to 1000° C. (preferably 800 to 900° C.) in an atmosphere ranging from nitrogen to air. The time for keeping the calcination is appropriately set within the range of 0.5 to 5.0 hr. The temporarily fired product is pulverized after the calcination.

As materials for the accessory component, powders of oxides or compounds to become oxides upon heating are added. Specifically, $SiO_2$, $CaCO_3$, and $Nb_2O_5$ mentioned above are used. Typically, these material powders of the accessory component are mixed with the powders of the main component pulverized after the calcination. Alternatively, they may be mixed with the material powders of the main component at the initial stage and then temporarily fired therewith.

The mixed powders obtained after pulverizing the temporarily fired product are granulated in order to make their shaping step smoother. The granulation can be done by using a spray dryer, for example. For instance, the mixed powders having a small amount of polyvinyl alcohol (PVA) added thereto are sprayed and dried by a spray dryer. The particle size of granules is about 80 to 200 μm.

Thus obtained granules are shaped into a predetermined form by a press with a mold having the predetermined form, for example. Thus shaped body is fired in a firing step.

In the firing step, it is necessary to control the firing temperature as mentioned above. The firing is carried out by keeping the firing temperature within the range of 1090 to 1145° C., preferably within the range of 1100 to 1135° C., for a predetermined time. When the firing temperature is lower than 1090° C., there tends to occur a disadvantage that the sintered density decreases, thereby lowering the saturated magnetic flux density. When the firing temperature exceeds 1145° C., on the other hand, the average crystal particle size of ferrite crystal particles tends to become greater than a desirable upper limit, thereby deteriorating characteristics at a high frequency of 2 MHz.

Thus manufactured NiMnZn-based ferrite of the present invention is shaped into a core (magnetic core) form as an example of preferred modes of use, and the core is wound with a lead, so as to be used as an electronic component. Using such an electronic component as a transformer and/or choke coil employed in a switching power supply operated at a switching frequency of 2 MHz or higher is also a very favorable mode.

The present invention will now be explained in further detail with reference to specific examples.

EXPERIMENTAL EXAMPLE I

As listed in Sample No. I-5 in the following Table 1, main component materials to become the main component were weighed such that the final composition would contain 56.0 mol % of iron oxide in terms of $Fe_2O_3$, 36.9 mol % of manganese oxide in terms of MnO, 4.3 mol % of zinc oxide in terms of ZnO, and 2.8 mol % of nickel oxide in terms of NiO.

The weighed materials were mixed in a wet fashion in a wet ball mill for 16 hr, and then dried. Subsequently, the dried product was temporarily fired for 3 hr at 850° C. in the air and then pulverized.

Powders of $SiO_2$, $CaCO_3$, and $Nb_2O_5$ were added as materials for the accessory component to the temporarily fired powders, and they were mixed and pulverized. The resulting mixed powders, with a binder added thereto, were granulated and then shaped into a toroidal body. The materials for the accessory component were added such that 300 ppm by weight of $SiO_2$, 1100 ppm by weight of Ca in terms of $CaCO_3$, and 600 ppm by weight of $Nb_2O_5$ were contained with respect to the materials for the main component.

The shaped body having a toroidal form was fired for 4 hr at 1125° C. while controlling the oxygen partial pressure, so as to make the ferrite fired body of Sample No. I-5 listed in the following Table 1.

Based on the technique for making the ferrite fired body of Sample No. I-5, various samples listed in the following Table 1 were produced.

For each of the samples listed in Table 1, (1) average crystal particle size, (2) sintered density ρ, (3) initial magnetic permeability (4) magnetic loss (core loss), and (5) saturated magnetic flux density Bs were determined.

(1) Average Crystal Particle Size

It was determined by observation through an optical microscope. The number of particles N to be measured was 50.

(2) Sintered Density ρ

It was determined by a calculation based on Archimedes' principle from respective weights of the sample measured in the air and water.

(3) Initial Magnetic Permeability μi

The initial magnetic permeability μi at 1 MHz and 25° C. was determined.

(4) Magnetic Loss (Core Loss)

Using a B-H analyzer, respective losses at 25° C. and 100° C. were determined while applying a 2 MHz, 50 mT sinusoidal AC magnetic field.

(5) Saturated Magnetic Flux Density Bs (T)

After winding each toroidal sample with 20 double turns of a wire, its saturated magnetic flux density was measured by a DC magnetization characteristic tester (SY110 manufactured by METRON GIKEN, Inc.) while the applied magnetic field was set to 1194 A/m.

The following Table 1 lists the results.

TABLE 1

(part 1)

| Sample No. | Main component | | | | Accessory component | | |
|---|---|---|---|---|---|---|---|
| | $Fe_2O_3$ (mol %) | MnO (mol %) | ZnO (mol %) | NiO (mol %) | $SiO_2$ (wtppm) | $CaCO_3$ (wtppm) | $Nb_2O_5$ (wtppm) |
| I-1 (comparative) | 56.0 | 39.7 | 4.3 | 0.0 | 300 | 1100 | 600 |
| I-2 | 56.0 | 39.2 | 4.3 | 0.5 | 300 | 1100 | 600 |
| I-3 | 56.0 | 38.2 | 4.3 | 1.5 | 300 | 1100 | 600 |
| I-4 | 56.0 | 37.3 | 4.3 | 2.4 | 300 | 1100 | 600 |
| I-5 | 56.0 | 36.9 | 4.3 | 2.8 | 300 | 1100 | 600 |
| I-6 | 56.0 | 35.7 | 4.3 | 4.0 | 300 | 1100 | 600 |
| I-7 | 56.0 | 35.0 | 4.3 | 4.7 | 300 | 1100 | 600 |
| I-8 (comparative) | 56.0 | 34.7 | 4.3 | 5.0 | 300 | 1100 | 600 |
| I-9 (comparative) | 56.0 | 41.3 | 1.8 | 2.7 | 300 | 1100 | 600 |
| I-10 | 56.0 | 39.3 | 2.0 | 2.7 | 300 | 1100 | 600 |
| I-11 | 56.0 | 35.9 | 6.0 | 2.7 | 300 | 1100 | 600 |
| I-12 | 56.0 | 34.9 | 7.0 | 2.7 | 300 | 1100 | 600 |
| I-13 (comparative) | 56.0 | 34.1 | 7.8 | 2.7 | 300 | 1100 | 600 |
| I-14 (comparative) | 53.7 | 39.3 | 4.3 | 2.7 | 300 | 1100 | 600 |
| I-15 | 54.0 | 39.0 | 4.3 | 2.7 | 300 | 1100 | 600 |
| I-16 | 57.5 | 36.5 | 4.3 | 2.7 | 300 | 1100 | 600 |
| I-17 (comparative) | 57.9 | 36.1 | 4.3 | 2.7 | 300 | 1100 | 600 |
| I-18 (comparative) | 56.0 | 37.3 | 4.3 | 2.4 | 50 | 1100 | 600 |
| I-19 | 56.0 | 37.3 | 4.3 | 2.4 | 100 | 1100 | 600 |
| I-20 | 56.0 | 37.3 | 4.3 | 2.4 | 800 | 1100 | 600 |
| I-21 | 56.0 | 37.3 | 4.3 | 2.4 | 1000 | 1100 | 600 |
| I-22 (comparative) | 56.0 | 37.3 | 4.3 | 2.4 | 1200 | 1100 | 600 |
| I-23 (comparative) | 56.0 | 37.3 | 4.3 | 2.4 | 300 | 500 | 600 |
| I-24 | 56.0 | 37.3 | 4.3 | 2.4 | 300 | 800 | 600 |
| I-25 | 56.0 | 37.3 | 4.3 | 2.4 | 300 | 2000 | 600 |
| I-26 | 56.0 | 37.3 | 4.3 | 2.4 | 300 | 3000 | 600 |
| I-27 (comparative) | 56.0 | 37.3 | 4.3 | 2.4 | 300 | 3500 | 600 |
| I-28 (comparative) | 56.0 | 37.3 | 4.3 | 2.4 | 300 | 1100 | 500 |
| I-29 | 56.0 | 37.3 | 4.3 | 2.4 | 300 | 1100 | 520 |
| I-30 | 56.0 | 37.3 | 4.3 | 2.4 | 300 | 1100 | 1000 |
| I-31 (comparative) | 56.0 | 37.3 | 4.3 | 2.4 | 300 | 1100 | 1100 |

(part 2: sequel)

| Sample No. | Firing temp (°C.) | Average crystal particle size (μm) | Sintered density ρ (g/cm³) | Initial magnetic permeability μi | Pcv (kW/m³) at 2 MHz, 50 mT | | Bs (mT) | |
|---|---|---|---|---|---|---|---|---|
| | | | | | 25° C. | 100° C. | 25° C. | 100° C. |
| I-1 (comparative) | 1125 | 26.5 | 4.96 | 930 | 5682 | 8488 | 550 | 468 |
| I-2 | 1125 | 8.4 | 4.96 | 935 | 2925 | 2626 | 546 | 470 |
| I-3 | 1125 | 4.4 | 4.97 | 955 | 2044 | 2017 | 540 | 472 |
| I-4 | 1125 | 3.3 | 4.97 | 970 | 2122 | 1992 | 535 | 470 |
| I-5 | 1125 | 3.0 | 4.97 | 956 | 2193 | 1877 | 535 | 470 |
| I-6 | 1125 | 2.3 | 4.93 | 840 | 2783 | 2089 | 525 | 467 |
| I-7 | 1125 | 2.1 | 4.93 | 815 | 2962 | 2024 | 522 | 464 |
| I-8 (comparative) | 1125 | 1.8 | 4.92 | 768 | 3210 | 2130 | 517 | 463 |
| I-9 (comparative) | 1125 | 4.5 | 4.89 | 776 | 3345 | 2013 | 514 | 448 |
| I-10 | 1125 | 4.3 | 4.93 | 804 | 2985 | 1821 | 521 | 457 |
| I-11 | 1125 | 3.4 | 4.97 | 1142 | 1827 | 2338 | 550 | 472 |
| I-12 | 1125 | 4.7 | 4.97 | 1185 | 1703 | 2457 | 552 | 469 |
| I-13 (comparative) | 1125 | 8.7 | 4.98 | 1243 | 1686 | 2734 | 554 | 465 |
| I-14 (comparative) | 1125 | 2.5 | 4.94 | 855 | 3125 | 2859 | 518 | 448 |
| I-15 | 1125 | 2.8 | 4.95 | 899 | 2978 | 2687 | 522 | 452 |
| I-16 | 1125 | 5.8 | 4.91 | 812 | 1934 | 1722 | 541 | 475 |
| I-17 (comparative) | 1125 | 7.8 | 4.88 | 686 | 2123 | 1960 | 542 | 478 |
| I-18 (comparative) | 1125 | 9.8 | 4.89 | 689 | 4399 | 2855 | 514 | 449 |
| I-19 | 1125 | 4.5 | 4.92 | 912 | 2989 | 2347 | 520 | 457 |
| I-20 | 1125 | 3.1 | 4.93 | 1011 | 2245 | 2344 | 532 | 471 |
| I-21 | 1125 | 2.2 | 4.90 | 933 | 2768 | 2567 | 524 | 462 |
| I-22 (comparative) | 1125 | 2.0 | 4.84 | 642 | 3378 | 2876 | 509 | 448 |
| I-23 (comparative) | 1125 | 7.8 | 4.95 | 952 | 2354 | 2811 | 529 | 466 |
| I-24 | 1125 | 4.2 | 4.97 | 973 | 2125 | 2268 | 535 | 471 |
| I-25 | 1125 | 5.3 | 4.95 | 942 | 2560 | 2289 | 530 | 467 |
| I-26 | 1125 | 6.2 | 4.90 | 899 | 2893 | 2357 | 520 | 456 |
| I-27 (comparative) | 1125 | 18.4 | 4.88 | 884 | 5633 | 4355 | 510 | 447 |

TABLE 1-continued

| | | | | | | | | |
|---|---|---|---|---|---|---|---|---|
| I-28 (comparative) | 1125 | 4.0 | 4.89 | 927 | 2087 | 2008 | 517 | 452 |
| I-29 | 1125 | 3.9 | 4.92 | 942 | 2111 | 1999 | 524 | 461 |
| I-30 | 1125 | 5.7 | 4.99 | 991 | 2263 | 2054 | 538 | 475 |
| I-31 (comparative) | 1125 | 14.4 | 5.01 | 879 | 4223 | 3987 | 543 | 483 |

EXPERIMENTAL EXAMPLE II

Sample Nos. II-1, II-2, II-3, and II-4 having different average crystal particle sizes were made by changing the firing temperature as listed in the following Table 2 in the same composition as that of Sample No. I-5 in the above-mentioned Table 1. Ferrite physical properties of these samples were determined as in the above-mentioned Experimental Example I.

The following Table 2 lists the results.

TABLE 2

| Sample No. | Firing temp (° C.) | Average crystal particle size (μm) | Sintered density ρ (g/cm$^3$) | Initial magnetic permeability μi | Pcv (kW/m$^3$) at 2 MHz, 50 mT | | Bs (mT) | |
|---|---|---|---|---|---|---|---|---|
| | | | | | 25° C. | 100° C. | 25° C. | 100° C. |
| I-5 | 1125 | 3.0 | 4.97 | 956 | 2193 | 1877 | 535 | 470 |
| II-1 | 1100 | 2.1 | 4.93 | 940 | 2018 | 1770 | 526 | 460 |
| II-2 | 1140 | 3.6 | 4.99 | 980 | 2367 | 2209 | 538 | 472 |
| II-3 (comparative) | 1160 | 9.5 | 5.01 | 1089 | 3230 | 2784 | 543 | 478 |
| II-4 (comparative) | 1230 | 16.3 | 5.01 | 1213 | 4577 | 3652 | 543 | 478 |

$Fe_2O_3$ = 56.0 mol %;
MnO = 36.9 mol %;
ZnO = 4.3 mol %;
NiO = 2.8 mol %;
$SiO_2$ = 300 wtppm;
$CaCO_3$ = 1100 wtppm;
$Nb_2O_5$ = 600 wtppm

EXPERIMENTAL EXAMPLE III

Sample Nos. III-1, III-2, III-3, and III-4 having different average crystal particle sizes were made by changing the firing temperature as listed in the following Table 3 in the same composition as that of Sample No. I-29 in the above-mentioned Table 1. Ferrite physical properties of these samples were determined as in the above-mentioned Experimental Example I.

The following Table 3 lists the results.

EXPERIMENTAL EXAMPLE IV

Sample Nos. IV-1, IV-2, IV-3, and IV-4 having different average crystal particle sizes were made by changing the firing temperature as listed in the following Table 4 in the same composition as that of Sample No. I-30 in the above-mentioned Table 1. Ferrite physical properties of these samples were determined as in the above-mentioned Experimental Example I.

TABLE 3

| Sample No. | Firing temp (° C.) | Average crystal particle size (μm) | Sintered density ρ (g/cm$^3$) | Initial magnetic permeability μi | Pcv (kW/m$^3$) at 2 MHz, 50 mT | | Bs (mT) | |
|---|---|---|---|---|---|---|---|---|
| | | | | | 25° C. | 100° C. | 25° C. | 100° C. |
| I-29 | 1125 | 3.9 | 4.92 | 942 | 2111 | 1999 | 524 | 461 |
| III-1 | 1100 | 2.5 | 4.90 | 923 | 2230 | 1815 | 520 | 458 |
| III-2 | 1140 | 7.5 | 4.94 | 965 | 2460 | 2226 | 528 | 463 |
| III-3 (comparative) | 1150 | 9.3 | 4.96 | 973 | 2827 | 2773 | 533 | 469 |
| III-4 (comparative) | 1230 | 12.2 | 5.00 | 996 | 3225 | 4380 | 538 | 474 |

$Fe_2O_3$ = 56.0 mol %;
MnO = 37.3 mol %;
ZnO = 4.3 mol %;
NiO = 2.4 mol %;
$SiO_2$ = 300 wtppm;
$CaCO_3$ = 1100 wtppm;
$Nb_2O_5$ = 520 wtppm The following Table 4 lists the results.

TABLE 4

| Sample No. | Firing temp (°C.) | Average crystal particle size (μm) | Sintered density ρ (g/cm³) | Initial magnetic permeability μi | Pcv (kW/m³) at 2 MHz, 50 mT | | Bs (mT) | |
|---|---|---|---|---|---|---|---|---|
| | | | | | 25° C. | 100° C. | 25° C. | 100° C. |
| I-30 | 1125 | 5.7 | 4.99 | 991 | 2263 | 2054 | 538 | 475 |
| IV-1 | 1100 | 3.4 | 4.96 | 956 | 2003 | 1890 | 532 | 471 |
| IV-2 | 1140 | 6.2 | 5.00 | 1004 | 2355 | 2152 | 540 | 475 |
| VI-3 (comparative) | 1160 | 9.2 | 5.01 | 1066 | 3752 | 3336 | 542 | 477 |
| VI-4 (comparative) | 1230 | 13.6 | 4.99 | 998 | 5595 | 6783 | 540 | 476 |

$Fe_2O_3$ = 56.0 mol %;
MnO = 37.3 mol %;
ZnO = 4.3 mol %;
NiO = 2.4 mol %;
$SiO_2$ = 300 wtppm;
$CaCO_3$ = 1100 wtppm;
$Nb_2O_5$ = 1000 wtppm Advantageous effects of the present invention are clear from the results of Experimental Examples I to IV mentioned above. That is, the NiMnZn-based ferrite of the present invention contains a main component comprising 54.0 to 57.5 mol % of iron oxide in terms of $Fe_2O_3$, 2.0 to 7.0 mol % of zinc oxide in terms of ZnO, 0.5 to 4.7 mol % of nickel oxide in terms of NiO, and a remainder of manganese oxide (in terms of MnO); and an accessory component comprising 100 to 1000 ppm by weight of Si in terms of $SiO_2$, 800 to 3000 ppm by weight of Ca in terms of $CaCO_3$, and 520 to 1000 ppm by weight of Nb in terms of $Nb_2O_5$ with respect to the main component; while having an average ferrite crystal particle size of 2.1 to 8.5 μm; and thus can reduce the magnetic loss (core loss) at a high frequency of 2 MHz or higher and achieve higher saturated magnetic flux density while forming high sintered density.

INDUSTRIAL APPLICABILTIY

The NiMnZn-based ferrite of the present invention can widely be utilized in various electric component industries.

What is claimed is:

1. A NiMnZn-based ferrite containing:
   a main component comprising 54.0 to 57.5 mol % of iron oxide in terms of $Fe_2O_3$, 2.0 to 7.0 mol % of zinc oxide in terms of ZnO, 0.5 to 4.7 mol % of nickel oxide in terms of NiO, and a remainder of manganese oxide (in terms of MnO); and
   an accessory component comprising 100 to 1000 ppm by weight of Si in terms of $SiO_2$, 800 to 3000 ppm by weight of Ca in terms of $CaCO_3$, and 520 to 1000 ppm by weight of Nb in terms of $Nb_2O_5$ with respect to the main component;
   wherein the ferrite has an average ferrite crystal particle size of 2.1 to 8.5 μm.

2. A NiMnZn-based ferrite according to claim 1, wherein the ferrite contains an accessory component comprising 160 to 940 ppm by weight of Si in terms of $SiO_2$, 900 to 2900 ppm by weight of Ca in terms of $CaCO_3$, and 560 to 960 ppm by weight of Nb in terms of $Nb_2O_5$ with respect to the main component.

3. A NiMnZn-based ferrite according to claim 1, wherein the ferrite has a sintered density of 4.90 g/cm³ or higher.

4. A NiMnZn-based ferrite according to claim 1, wherein a magnetic loss Pcv1 determined at 2 MHz, 50 mT, and 25° C. is 3000 kW/m³ or less, while a saturated magnetic flux density Bs at 25° C. is 520 mT or higher.

5. A NiMnZn-based ferrite according to claim 1, wherein a magnetic loss Pcv2 determined at 2 MHz, 50 mT, and 100° C. is 2700 kW/m³ or less, while a saturated magnetic flux density Bs at 100° C. is 450 mT or higher.

6. A NiMnZn-based ferrite according to claim 1, wherein an initial magnetic permeability μi at 1 MHz and 25° C. is 800 or higher.

7. An electronic component formed by winding the NiMnZn-based ferrite according to claim 1 as a core with a lead.

8. A switching power supply using the electronic component according to claim 7 as a transformer and/or a choke coil and being operated at a switching frequency of 2 MHz or higher.

* * * * *